United States Patent [19]

Bellos et al.

[11] Patent Number: 4,818,410

[45] Date of Patent: Apr. 4, 1989

[54] METHOD OF REMOVING WATER SOLUBLE ORGANICS FROM OIL PROCESS WATER

[75] Inventors: Thomas J. Bellos; Roy W. Greenlee; Frederick T. Welge, all of St. Louis, Mo.

[73] Assignee: Petrolite Corporation, St. Louis, Mo.

[21] Appl. No.: 143,438

[22] Filed: Jan. 14, 1988

[51] Int. Cl.$^4$ .................. C02F 1/26; B01D 17/05
[52] U.S. Cl. ..................... 210/639; 210/708; 210/724; 210/799; 210/908; 252/329; 252/358
[58] Field of Search ........ 210/638, 639, 643, 704–708, 210/724, 725, 738, 749, 754, 766, 799, 908; 252/328–330, 347, 348, 358

[56] References Cited

U.S. PATENT DOCUMENTS

| Re. 29,908 | 2/1979 | Fowler et al. | 210/708 |
| 3,108,059 | 10/1963 | Greenwald | 210/708 X |
| 3,687,845 | 8/1972 | Treat | 252/348 X |
| 3,707,464 | 12/1972 | Burns et al. | 210/724 X |
| 4,035,289 | 7/1977 | Guillerme et al. | 210/724 X |
| 4,058,453 | 11/1977 | Patel et al. | 252/329 X |
| 4,198,294 | 4/1980 | Deane | 210/704 X |
| 4,283,290 | 8/1981 | Davies | 210/643 |
| 4,311,596 | 1/1982 | Gleim | 210/725 X |
| 4,317,487 | 3/1982 | Merkl | 252/358 |

Primary Examiner—Tom Wyse
Attorney, Agent, or Firm—Robert E. Wexler

[57] ABSTRACT

Oil well production fluid composed of oil and water and containing in excess of 100 ppm water soluble petroleum carboxylates in anionic form dissolved in the water is treated by acidifying the fluid to a pH of 6.0 or lower with a strong acid and then is intimately mixed. The oil and water are separated one from the other. The content of the water soluble organics in the water is thereby substantially transferred to the oil phase. In a second aspect of the invention, water used to extract corrosion compounds to render the oil suitable for fueling gas turbine power plants is acidified to a pH of 6.0 or lower and is thereafter intimately mixed with fuel oil.

20 Claims, 1 Drawing Sheet

METHOD OF REMOVING WATER SOLUBLE ORGANICS FROM OIL PROCESS WATER

BACKGROUND OF THE INVENTION

1. Field of the Invention

This invention relates to the removal and recovery of water soluble organics (WSO) from oil process water. In particular, the present invention relates to the removal and recovery of certain water soluble petroleum organics from crude oil production water and from aqueous streams used in removing water and/or inorganic salts, such as sodium chloride, from crude oil, residual oil, waste oils and the like.

In the removal of crude oil or production fluid from earth formations significant quantities of water are quite often removed along with the oil. In the Middle East the production fluid can be virtually pure oil. However, it is not uncommon that oil well production fluids are composed of 90% or more of water and only 10% or less of crude oil. Such water is referred to as connate water and is produced along with the oil. One of the first steps after removal of the oil well production fluid is to separate the oil from the water by phase separation techniques. Separation is conventionally accomplished using a bulk separator or a free water knock out system. Virtually all of the hydrocarbon is conveniently recovered in this manner. Unfortunately, certain organic compounds, as well as inorganic salts and acids, are soluble in water; and mere phase separation will not remove the water soluble compounds from the aqueous phase. Water soluble organics include, among other things, certain naphthenates, phenols, lower fatty acids, etc. Water soluble inorganic salts include sodium chloride, sodium sulfate, calcium chloride, barium chloride, etc. While the amount of water soluble organics may be relatively small, up to 1,000 ppm, they nevertheless give rise to environmental problems, when the aqueous phase is discharged into the environment without the removal of the water soluble organics. Furthermore, the water soluble organics may be valuable substances. In order to meet present day strict environmental standards, a process to reduce the level of the water soluble organics in the discharged streams to 50 ppm or less is needed. The present invention provides a simple, economical procedure for accomplishing this end. While known methods can reduce the content of water soluble organics to the desired low level, they are relatively complex and/or expensive in comparison with the process of the present invention. For example, one could separate the water and water soluble organics by distillation or the use of biological treating ponds.

Use of certain petroleum fuel oils for specific purposes requires that such oils be treated in order to remove undesirable corrosive contaminants therefrom. For example, fuel oils used in the newer, high efficient, gas turbine power plants must meet certain strict requirements with respect to the presence of inorganic contaminants in the oil. The presence of sodium chloride and other similar inorganic salts renders the oil less than suitable as a fuel for use in gas turbine power plants. To upgrade fuel oil so that it is acceptable for use in the turbines, the fuel oil is commonly processed using a multi-stage electrostatic desalting facility. In such operation essentially complete removal of water soluble inorganic salts from fuel oil is accomplished by a counter-current water washing process in which a high electrostatic gradient is used to break the interim water-in-oil emulsion. Selective specialized chemical demulsifiers are normally used in such salt removal processes. While the process removes the inorganic salts from the fuel oil, unfortunately the wash water removes the water soluble organics from the fuel oil. In view of strict environmental standards, it is of considerable importance to remove these water soluble organics present in the wash water of the inorganic salt removal processes used to render the fuel acceptable for burning in turbines.

The invention is directed to a simple, straight-forward method of removal of water soluble organics from oil well production fluids, as well as from aqueous streams used to render fuel oil acceptable for use as fuel for gas turbine power plants by the removal of inorganic salts therefrom.

2. Description of the Prior Art

U.S. Pat. No. Re. 29,908 discloses recovery of oily waste in water by the use of a demulsification-flocculation separation process employing a combination acid-alum treatment. This process has no effect of removing water soluble oils.

U.S. Pat. No. 3,687,845 discloses removal of tramp oils from oil-in-water emulsions by the addition of a water soluble anionic polymer of high molecular weight and heat treatment of the emulsions so that the oils are coalesced and float to the surface of the liquid. Water soluble oils are unaffected by this treatment.

U.S. Pat. No. 3,707,464 discloses the addition of caustic or acid to adjust the pH of the liquid to about 8.0 to accelerate gravitational separation of oils and solids and the use of elevated temperatures to accelerate the separation process. Rather than being removed, water soluble organics in the solution would be stabilized by this treatment.

U.S. Pat. No. 4,035,289 discloses the use of microorganisms to reduce the presence of organic material in mineral oil drilling fluids. This is an example of the slow, expensive known methods involving biological treatments or use of absorbents, like charcoal and/or ion exchange resins.

SUMMARY OF THE INVENTION

In accordance with the present invention, there is provided a process for the removal of petroleum organic substances dissolved in aqueous streams. Such aqueous streams include oil well production fluids from which oil has been primarily separated and aqueous streams used in extracting inorganic salts, such as sodium chloride, from oils, in order to render such oils satisfactory for subsequent refining or for burning in gas turbine power plants or processing in other equipment where the presence of the inorganic salts is undesirable. The oil process water to which the present invention applies may contain dissolved therein a small amount, e.g., 100–1000 ppm or more, of petroleum organics. First, the pH of the oil process water is adjusted to within the range of about 2 to 6, preferably in the range of 3–5 by incorporating a strong acid therein, for example hydrochloric acid or sulfuric acid. Other strong acids, either organic or inorganic may be used. The pH adjustment may be made for an appropriate oil/water mixture or a previously acidified aqueous stream. Second, during or after the pH adjustment, the oil process water is intimately contacted with oil with the result that the content of water soluble organics in the oil process water is substantially reduced by being transferred from the water to the oil. Finally, the oil is separated from the oil process water.

By practicing the present invention one is able advantageously to recover considerable amounts of valuable material and to avoid or minimize the need to upgrade oil process water prior to discharge in the environment by employing high cost waste treatment procedures.

For example, typically an operator may treat 900,000 barrels of water per day associated with its crude oil production. The water thus made available for tertiary water treatment contains 1,000 ppm of free oil plus water soluble oil. Distribution between these two oil forms may be 50/50. Therefore in such operation 37,800 gallons of water soluble organics are carried along as a very minor attendent component of the enormous volume of water being handled.

About 450 barrels of the free oil per day present as a dilute dispersion of fine oil droplets is removable from this flow by established methods, including use of induced air flotation with or with out demulsifiers and flocculants. Thus, 18,900 gallons of valuable oil may be routinely recovered. However, another 450 barrels water soluble organics per day of about equal value remains dissolved in the water, which may be reinjected downhole. The present invention provides a convenient method to recover the water soluble oil also. Additionally, the present invention can be advantageously used in the on-site processing of certain petroleum products as fuel.

Often the operator is able to dispose of its contaminated water, containing water soluble organics, by reinjection. In other cases where this option is not available, lack of a practical method to remove the water soluble organic component would invoke another even larger penalty—from environmental regulations. In order to remove the water soluble organic component of the contaminated water to make possible its disposal in streams or in aquafers, slow biological percolation in a series of treatment ponds, with consequent high cost, may be the operator's only option.

DETAILED DESCRIPTION OF THE PREFERRED EMBODIMENTS

It is conventional to denote the water soluble organics found in and recovered from petroleum generally as "petroleum acids" and more specifically as "naphthenic acids". Chemically, the petroleum acids are, in the main, monocarboxylic acids related to the naphthene (alicyclic) series of hydrocarbons. However, other petroleum acidic substances are included. For example, substituted phenols, mercaptans, long chain ketones, etc. may act as petroleum acids in the sense of this process. Petroleum acids are natural components of crude oil and are not formed by refining. A typical formula of the acids may be written as $R(CH_2)_nCOOH$, wherein R may be a cyclic moiety composed of 1, 2, 3 or more rings including such acids as cyclopentaneacetic acid and trans-2,2,6-trimethylcyclohexylacetic acid and n is usually 1 or higher. Aromatic rings, saturated rings and fused rings are normally present. It has been found that as many as 120 or more different petroleum acids may be present in a given crude oil. Most are soluble in all proportions in hydrocarbons, but most of the acids of the series have only slight solubility in water. However, as their sodium salts or other alkali metal salts these naphthenates are preferentially water soluble. It is with these water soluble organics that the present invention is concerned. It is to be understood that, at the pH of the naturally occurring aqueous compositions, the acids may exist as anions in association with counterions of sodium, calcium, etc. For example, naphthenic acids can be regarded as being present as naphthenate salts. Often, therefore, petroleum acids in the aqueous phase of oil production fluids are in anionic form and may be more properly termed as petroleum carboxylate salts, phenates and other salts.

Figure 1:
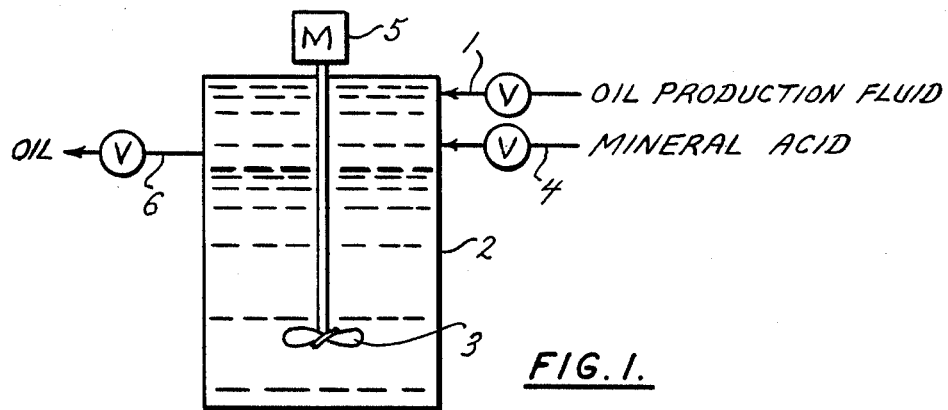
FIG. 1 is a schematic block diagram showing apparatus for practicing the present invention with an oil/water stream, wherein a mineral acid is introduced to provide transfer of water soluble oil into the oil phase. An air flotation system (AFS) is used to remove minute particles of insoluble oil.

Having described the process of the present invention briefly and in general terms, reference is now made to the drawings which illustrate diagrammatically specific embodiments of the present invention. Referring now to the flow diagram in FIG. 1 of the drawings, it is noted that in operation oil production fluid from a suitable source is moved through conduit 1 into a tank 2 which is equipped with a stirring device 3. An aqueous solution of strong acid, preferably a strong mineral acid, is also added to the tank through conduit 4 before, after or during the pumping of the oil production feed into tank 2. The hydrocarbon, e.g. a fuel, and the acid can be mixed prior to entering the tank, if desired. The amount of acid selected to be added is sufficient to lower the pH of the contents of the tank or flowing production line to between about 2-6. When the tank is suitably filled, the stirrer is rotated by means of a motor 5 or other driving means at a relatively low shear to provide intimate contact of the two phases without giving rise to significant emulsification of the oil phase and the liquid phase. Chemical oil-in-water demulsifiers and/or special flocculants, if needed, may be added separately or along with the feed or acid solution. If high shear conditions are avoided, a chemical demulsifier will not usually be needed.

Next the stirrer is stopped and the aqueous layer is allowed to separate gravitationally from the oil layer. The separated oil containing the petroleum carboxylate salts, etc. taken up from the aqueous phase is removed from tank 2 through a conduit 6.

The aqueous phase is transferred from tank 2 through a conduit 7 to an air flotation system (AFS) generally denoted by reference numeral 8 of conventional construction for further separation of the oil from the water, if needed. Other flotation systems, such as dissolved air flotation, can likewise be used to separate the oil from the water. Hence the invention is not limited to the use of any particular separation technique. A gas, such as air or more preferably oil field gas, i.e., methane, ethane, etc., is maintained in the cavity 9 of the container 10. A suitably bladed stirrer 11 powered by motor 12 is rotated to form a vortex 13 where the gas becomes mixed with liquid in container 10. As the gas is propelled into the liquid, the gas induces the minute particles of oil that may be entrained in the liquid to float to the top of container 10. A porous screen 14 surrounds the stirrer and aids the gas induced flotation of the oil particles. The oil is skimmed and removed from the system through conduit 15. A partial recycle of the water may be accomplished by diverting part of the water through recycle line 16, if needed. The water, whose petroleum acids content has been substantially reduced, is withdrawn from conduit 17. The water has a low level of water soluble organics, namely 50 ppm or less.

A standard air flotation system conventionally comprises a plurality of induced-gas flotation compartments, serially and/or parallel arranged, instead of one as illustrated herein. Each compartment may use a vertical direct rotating drive unit to disperse air or other gas into the aqueous stream by means of vortex generation and adjustable gates for skimming off the oil. An outlet cell (not shown) may be included to provide a quiescent zone for final separation of entrained gas and any particulates.

A conventional AFS system therefore involves means for entraining a suitable gas in the process water, means for mixing the liquid and gas, and recycle loops. Often, several stages of such equipment is provided in series in order to more completely separate free oil from the water. Under ordinary circumstances even at optimum operations, such equipment would discharge an effluent, from which essentially none of the water soluble organics had been removed. With the practice of the present invention, the effluent water would be almost free of both water soluble oil and water insoluble oil.

Figure 2:
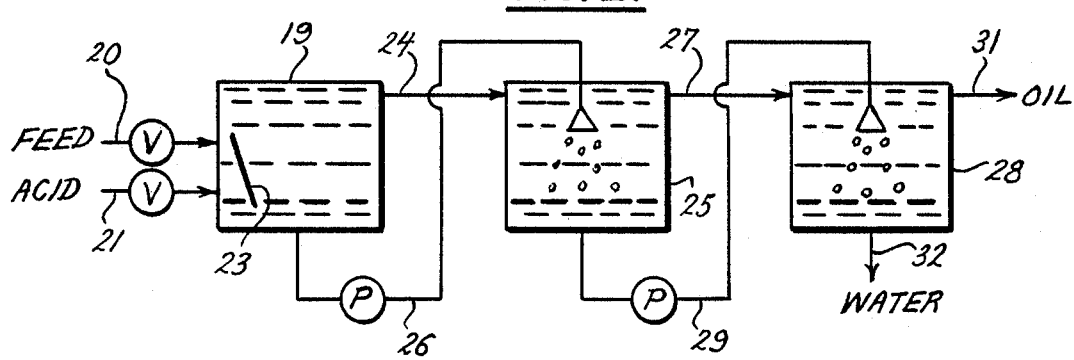
FIG. 2 is a schematic block diagram showing another apparatus for practicing the present invention with an oil/water production stream in a continuous manner.

With reference now to FIG. 2 where a continuous system of water soluble organics removal and recovery is employed, oil production fluid or feed from a suitable source is brought into a tank 20 through a conduit 21; and an aqueous solution of a strong acid, preferably a strong mineral acid, is brought into tank 19 through a conduit 21 to lower the pH to the desired range of 2–6. The feed enters the tank through conduit 20 and impinges on a baffle 23. This results in an intimate but low shear mixing of the two feeds under conditions such that emulsification does not become a substantial problem. The oil phase is moved through a conduit 24 into a tank 25. The aqueous phase is removed from tank 20 and pumped through a conduit 26 and discharged into the oil phase in tank 25 in the form of droplets or like minute particles. The droplets migrate through the oil phase and settle into the aqueous phase at the bottom of tank 25. As the droplets move through the oil phase, the water soluble organics are extracted from the aqueous phase and taken up by the oil phase.

The oil phase in tank 25 moves through a conduit 27 into a tank 28. The aqueous phase is removed from the bottom of tank 25 and pumped through a conduit 29 and discharged into the oil phase in tank 28 in the form of droplets or like minute particles. The droplets migrate through the oil phase and into the aqueous phase at the bottom of tank 28. Again, as the droplets move through the oil phase, the water soluble organics are extracted from the acid phase and are taken up by the oil phase. The oil phase leaves the system through a conduit 31 and the aqueous phase leaves the system through a conduit 32. If required, additional extraction tanks can be incorporated serially into the system to further reduce the amount of water soluble organics in the aqueous phase.

Figure 3:
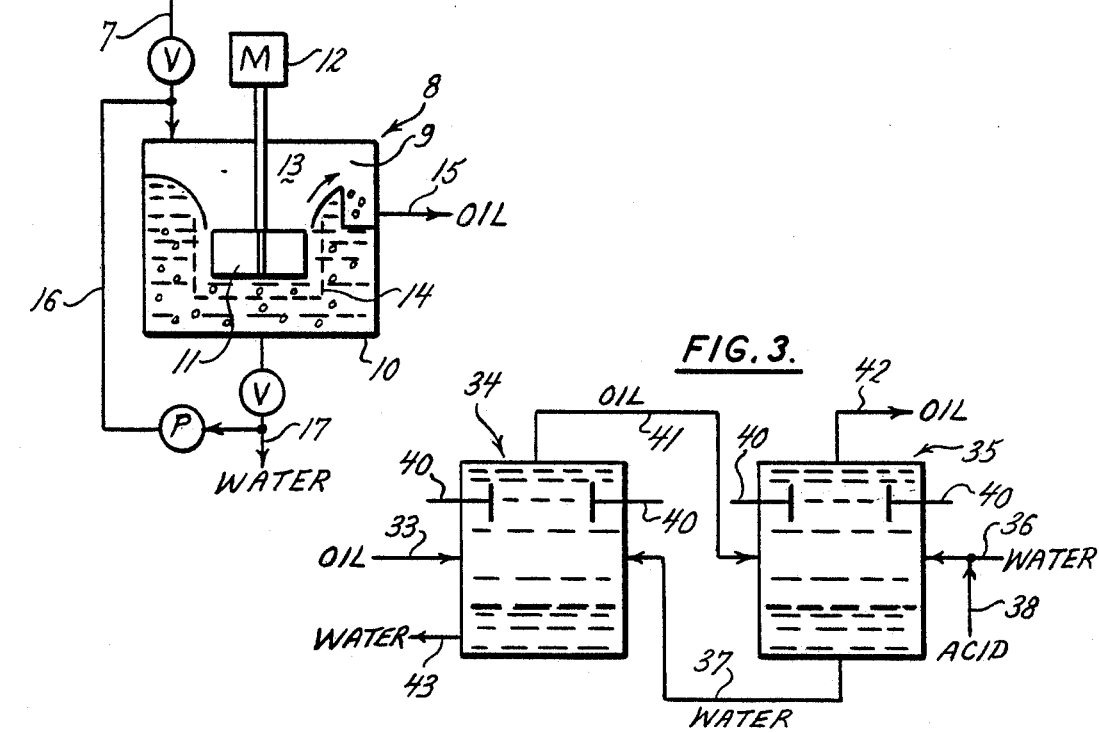
FIG. 3 is a schematic block diagram showing yet another apparatus for practicing the present invention, wherein acidified wash water runs countercurrent to oil flow in an electrostatic fuel oil desalter. In the operation the soluble oil is retained by the desalted fuel oil; and the effluent water has a reduced quantity of water soluble oil.

With reference now to FIG. 3, fuel oil having an inorganic salt content too high to meet the requirements for suitable burning in high-efficiency electric power generating units is fed continuously via a line 33 into a first electrostatic fuel wash unit 34. Water of acceptable quality is fed continuously to a second electrostatic fuel wash unit 35 via a line 36. The wash water from unit 35 is moved to unit 34 via a line 37. An aqueous solution of a strong acid, preferably a strong mineral acid, is injected continuously into line 36 via a line 38 in amounts sufficient to lower the pH of the wash water to 6 or below. In units 34 and 35 a high voltage, low ampere gradient is maintained between the electrodes 40 during operation. Although not specifically disclosed, the system can be provided with an injection device which controls the amount of acid injected into the wash water automatically in response to the determined flow rate and pH of the wash water.

The oil washed in unit 34 is fed via a line 41 to the top section of unit 35, wherein the water soluble organics in the wash water are transferred in whole or in part back to the fuel. The amount of oil in the extraction unit should be normally at least 5% of the total liquid in the unit. The washed fuel containing the water soluble organics is moved to a burner or for further processing via a line 42. The wash water from which the water soluble organics have been removed is moved via a line 43 to a point of further processing or of discharge from the system.

The following examples describe various embodiments of the invention. Other embodiments within the scope of the claims herein will be apparent to one of ordinary skill in the art from consideration of the specification or practice of the invention disclosed herein. It is intended that the specification and examples be considered exemplary only with the scope and spirit of the invention being indicated by the claims which follow the examples. Unless otherwise indicated all percentages herein are on a weight percent basis.

EXAMPLE 1

Production oil well fluid having a temperature of 130° F. (54° C.) obtained in a California oil field was analyzed and found to be composed of about 90% water and 10% crude oil. The water had a pH of 7.0 and was analyzed and found to contain 480 ppm water soluble organics. At this level of organic matter the water is deemed unsatisfactory for returning to the environment. Five gallons (18.9 liters) of the production oil well fluid was placed in a first container of suitable size provided with a split disc stirrer and the container was placed in a heating bath to maintain the 130° F. (54° C.) temperature. Into the stirred mixture 15 ml of 15% hydrochloric acid solution was added which lowered the pH of the mixture to 3.0. Also added was a dithiocarbamate demulsifier (a free water knockout chemical) at a rate of 10 ppm to aid in the separation of the phases. Under relatively low shear conditions the mixture was stirred for 30 minutes at a speed of 300 rpm.

Stirring was discontinued and the layering of the oil and water was effected gravitationally by bulk separation. The water was decanted from the first container and pumped into an AFS unit. Into the ASF unit a cationic high molecular weight inverse emulsion polymer was added to provide a concentration of 3 ppm of the polymer in the water. The water was processed using a conventional AFS method which floats the oil to the surface and is skimmed off thereafter as above described. Water was removed from the AFS unit and was analyzed by an infrared procedure for total water soluble organics and oil. It was found that the treated water contained only 50 ppm water soluble organics and free oil and was deemed suitable for discharge into the environment.

EXAMPLE 2

Example 1 was repeated except that in this example, oil well fluid from the same oil field but containing 20% oil was stirred for 20 minutes at a speed of 245 rpm. Thirteen ml of 37% hydrochloric acid was employed. The pH of the water was measured after the addition of the acid and was found to be 4.2. It was determined that the treated oil contained only 41 ppm water soluble organics and free oil. The temperature of the feed fluid was 142° F. (61° C.) which was maintained throughout the treatment.

EXAMPLE 3

In this example, Example 1 was repeated except that the production oil field well fluid from the same oil field containing 10% oil was stirred for 10 minutes at a speed of 245 rpm. Twelve ml of concentrated sulfuric acid was employed. The pH of the water was measured to be 2.5. It was found that the treated water contained only 52 ppm water soluble organics and free oil. The temperature of the feed was 145° F. (63° C.) which was maintained throughout the treatment.

EXAMPLE 4

In this example, Example 1 was repeated except no acid was employed. It was found that the water before and after treatment contained virtually the same high level of water soluble organics. In other words, essentially none of the water soluble organics originally dissolved in the aqueous phase was transferred into the oil phase as occurred in the other examples employing lower pH's. Thus, no upgrading of the water was attained as was accomplished in the examples carried out in accordance with the present invention.

EXAMPLE 5

In this example the aqueous stream from a gas turbine fuel washing unit located at a power plant in the Southeastern section of the U.S.A. was employed. The unit was specially designed equipment for fuel washing to remove inorganic salts, particularly sodium chloride, in order to render fuel acceptable for burning in power generating turbines and had the capability of essentially complete removal of water-soluble inorganics salts from No. 6 turbine fuel flowing at 520 gallons (1968 liters) per minute by a counter-current water washing process in which a high electrostatic gradient is used to break the interim water-in-oil emulsion. While the treated fuel was upgraded by having its alkali metal and alkaline earth metal reduced significantly, the amount of petroleum carboxylates dissolved in wash water was too high to meet established water discharge standards. Sufficient sulfuric acid solution was injected into a moving stream of the fuel wash water to lower the pH of wash water from 8.35 to the range 4.5 to 6.0. The acidified wash water was in counter-current flow relative to that of the incoming raw fuel oil. It was noted that the total dissolved organic matter in the effluent water was greater than 100 ppm on the average before the acidification of the incoming wash water was begun but was less than about 5 ppm on the average after the acidification process was applied. The amount of sulfuric acid injected into the moving stream of the fuel wash water was reduced to lower the pH thereof to about 4.5. At this pH and at pH's up to 6.0, the level of water soluble organics in effluent fuel wash water decreased to less than 10 ppm. When the sulfuric acid injection was ceased, it was noted that the level of water soluble organics in the fuel wash water returned to the earlier high level exceeding 100 ppm.

What is claimed is:

1. A method of removing water soluble organics from oil process water comprising the steps of:
   (a) incorporating in the said water a strong acid to adjust the pH of the water to within the range of about 2-6;
   (b) thereafter or simultaneously making intimate contact between the acidified water and oil with the result that the content of water soluble organics in the water is substantially reduced by being transferred from the water to the oil; and
   (c) separating the oil and the water.

2. The method of claim 1 wherein the acid is a strong mineral acid.

3. The method of claim 2 wherein the pH is within the range of 3-6.

4. The method of claim 2 wherein the strong mineral acid is hydrochloric acid.

5. The method of claim 2 wherein the strong mineral acid is sulfuric acid.

6. The method of claim 1 wherein the water soluble organics include petroleum carboxylate anions.

7. The method of claim 1 wherein the water is the water removed from an oil well along with the crude oil.

8. The method of claim 7 wherein the pH is in the range of 3-6.

9. The method of claim 7 wherein the acid is hydrochloric acid.

10. The method of claim 7 wherein the acid is sulfuric acid.

11. The method of claim 1 wherein the water is the water used to extract corrosive inorganic compounds from fuel oil to render the fuel oil suitable for fueling gas turbine power plants.

12. The method of claim 11 wherein the pH is in the range of 3-6.

13. The method of claim 8 wherein the acid is hydrochloric acid.

14. The method of claim 8 wherein the acid is sulfuric acid.

15. A method of removing water soluble petroleum carboxylates in anionic form from water accompanying the removal of crude oil withdrawn from an oil well comprising the steps of:
   (a) separating the oil from the water;
   (b) adding a strong mineral acid to the water in a sufficient amount to reduce the pH of the water to within the range of 2-6;
   (c) intimately contacting the thus acidified water with oil with the result that the content of the water soluble organics in the water is substantially reduced by being transferred from the water to the oil; and
   (d) thereafter separating the oil from the acidified water.

16. The process of claim 15 wherein a chemical demulsifier is used in separating the oil from the water.

17. The process of claim 15 wherein the steps are carried out in a continuous fashion.

18. A method of removing water soluble petroleum carboxylates in anionic form from oil wash water comprising the steps of:
(a) adding a strong mineral acid to the water in a sufficient amount to the reduce the pH to within the range of about 2-6;
(b) intimately contacting thus-acidified water with oil with the result that the content of the water soluble organics in the water is substantially reduced by being transferred from the water to the oil; and
(c) thereafter separating the oil from the acidified water.

19. The process of claim 1 wherein a chemical demulsifier is used in separating the oil from the water.

20. The process of claim 19 wherein the steps are carried out in a continuous fashion.

* * * * *

REEXAMINATION CERTIFICATE (3559th)

United States Patent [19]

Bellos et al.

[11] B1 4,818,410

[45] Certificate Issued Jun. 30, 1998

[54] METHOD OF REMOVING WATER SOLUBLE ORGANICS FROM OIL PROCESS WATER

[75] Inventors: Thomas J. Bellos; Roy W. Greenlee; Frederick T. Welge, all of St. Louis, Mo.

[73] Assignee: Petrolite Corporation, St. Louis, Mo.

Reexamination Request:
No. 90/002,726, May 15, 1992

Reexamination Certificate for:
| | |
|---|---|
| Patent No.: | 4,818,410 |
| Issued: | Apr. 4, 1989 |
| Appl. No.: | 143,438 |
| Filed: | Jan. 14, 1988 |

[51] Int. Cl.⁶ .................... C02F 1/26; B01D 17/05
[52] U.S. Cl. .......... 210/639; 210/708; 210/724; 210/799; 210/908; 252/329; 252/358
[58] Field of Search .................. 210/638, 639, 210/643, 704–708, 724, 799, 754, 760; 252/328–330, 347, 348, 358

[56] References Cited

U.S. PATENT DOCUMENTS

| | | | |
|---|---|---|---|
| 2,504,019 | 3/1950 | Hall | 252/330 |
| 4,401,570 | 8/1983 | Blytas et al. | 210/639 |
| 4,839,054 | 6/1989 | Ruebush et al. | 210/639 |

FOREIGN PATENT DOCUMENTS

| | | |
|---|---|---|
| 958 438 | 5/1964 | United Kingdom. |
| 961 869 | 6/1964 | United Kingdom. |
| 1 346 030 | 2/1974 | United Kingdom. |
| 1 492 606 | 11/1977 | United Kingdom. |

OTHER PUBLICATIONS

Article entitled "Treatment of Refinery Emulsions and Chemical Wastes," Cecil Phillips, Jr., *Industrial and Engineering Chemistry*, vol. 46, No. 2, pp. 300–303, Feb. 1954 (Phillips Article).

Article entitled "Naphthenic Acids in Stratal Waters," Gerasyuto Z.S., *T.R. vs. Neft, Nauch.—Issled, Geologorazved, Inst.*, 342, 157–61 (1973) (Gerasyuto Article) including abstract and Russian version.

*Perry's Chemical Engineers' Handbook*, Perry et al 4th Edition, 14–40, 14–42 (1963) (Perry's Handbook).

*Federal Register*, vol. 1, No. 131, Jul. 9, 1986 (EPA Notice).

*Primary Examiner*—Peter A. Hruskoci

[57] ABSTRACT

Oil well production fluid composed of oil and water and containing in excess of 100 ppm water soluble petroleum carboxylates in anionic form dissolved in the water is treated by acidifying the fluid to a pH of 6.0 or lower with a strong acid and then is intimately mixed. The oil and water are separated one from the other. The content of the water soluble organics in the water is thereby substantially transferred to the oil phase. In a second aspect of the invention, water used to extract corrosion compounds to render the oil suitable for fueling gas turbine power plants is acidified to a pH of 6.0 or lower and is thereafter intimately mixed with fuel oil.

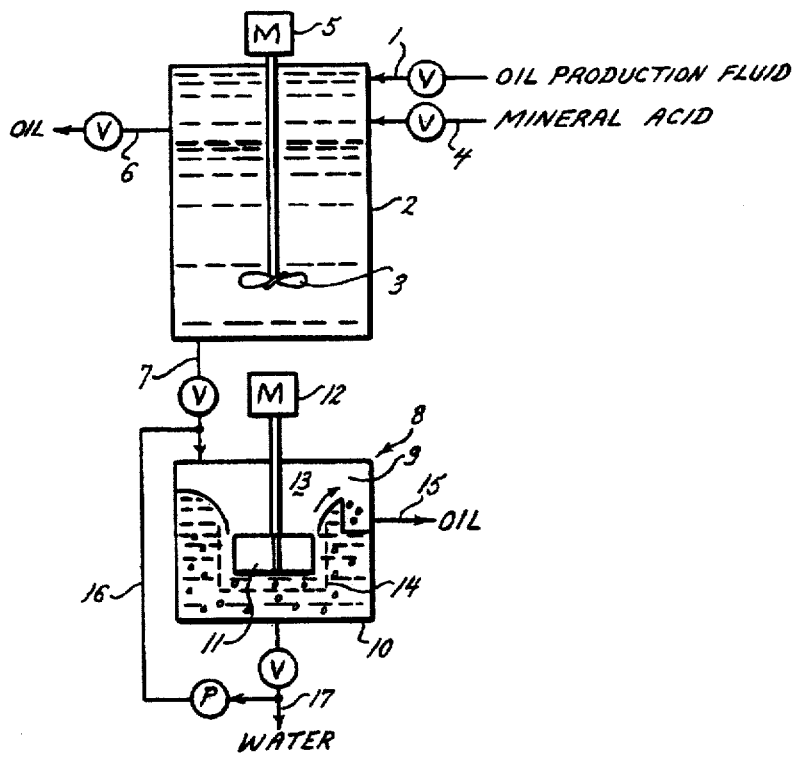

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7, 16 and 18 are cancelled.

Claims 1, 8–11 & 13–15 are determined to be patentable as amended.

Claims 2–6, 12, 17, 19 and 20, dependent on an amended claim, are determined to be patentable.

New claims 21 and 22 are added and determined to be patentable.

1. A method of removing water soluble organics from *an oil well production fluid, which comprises crude oil and water,* [process water] comprising the steps of:
   (a) *adding to the oil well production fluid* [incorporating in the said water] a strong acid to adjust the pH of the [water] *fluid* to within the range of about 2–6;
   (b) thereafter or simultaneously making intimate contact between the [acidified] water and oil *phases* with the result that the content of water soluble organics in the water is substantially reduced by being transferred from the water *phase* to the oil *phase*; and
   (c) separating the oil *phase* and the water *phase*.

8. The method of claim [7] *1* wherein the pH is in the range of 3–6.

9. The method of claim [7] *8* wherein the acid is hydrochloric acid.

10. The method of claim [7] *8* wherein the acid is sulfuric acid.

11. [The] *A* method of [claim 1] *removing water soluble organics from oil process water comprising the steps of:*
   (a) *incorporating in the said water a strong acid to adjust the pH of the water to within the range of about 2–6;*
   (b) *thereafter or simultaneously making intimate contact between the acidified water and oil with the result that the content of water soluble organics in the water is substantially reduced by being transferred from the water to the oil; and*
   (c) *separating the oil and the water* wherein the water is the water used to extract corrosive inorganic compounds from fuel oil to render the fuel oil suitable for fueling gas turbine power plants.

13. The method of claim [8] *11* wherein the acid is hydrochloric acid.

14. The method of claim [8] *11* wherein the acid is sulfuric acid.

15. A method of removing water soluble petroleum carboxylates in anionic form from water accompanying the removal of crude oil withdrawn from an oil well comprising the steps of:
   (a) separating the oil from the water *with a chemical demulsifier*;
   (b) adding a strong mineral acid to the water in a sufficient amount to reduce the pH of the water to within the range of 2–6;
   (c) intimately contacting the thus acidified water with oil with the result that the content of the water soluble organics in the water is substantially reduced by being transferred from the water to the oil; and
   (d) thereafter separating the oil from the acidified water.

*21. The method of claim 1 wherein the steps are carried out in a continuous fashion.*

*22. The method of claim 15 wherein the steps are carried out in a continuous fashion.*

* * * * *